Figure 1A:
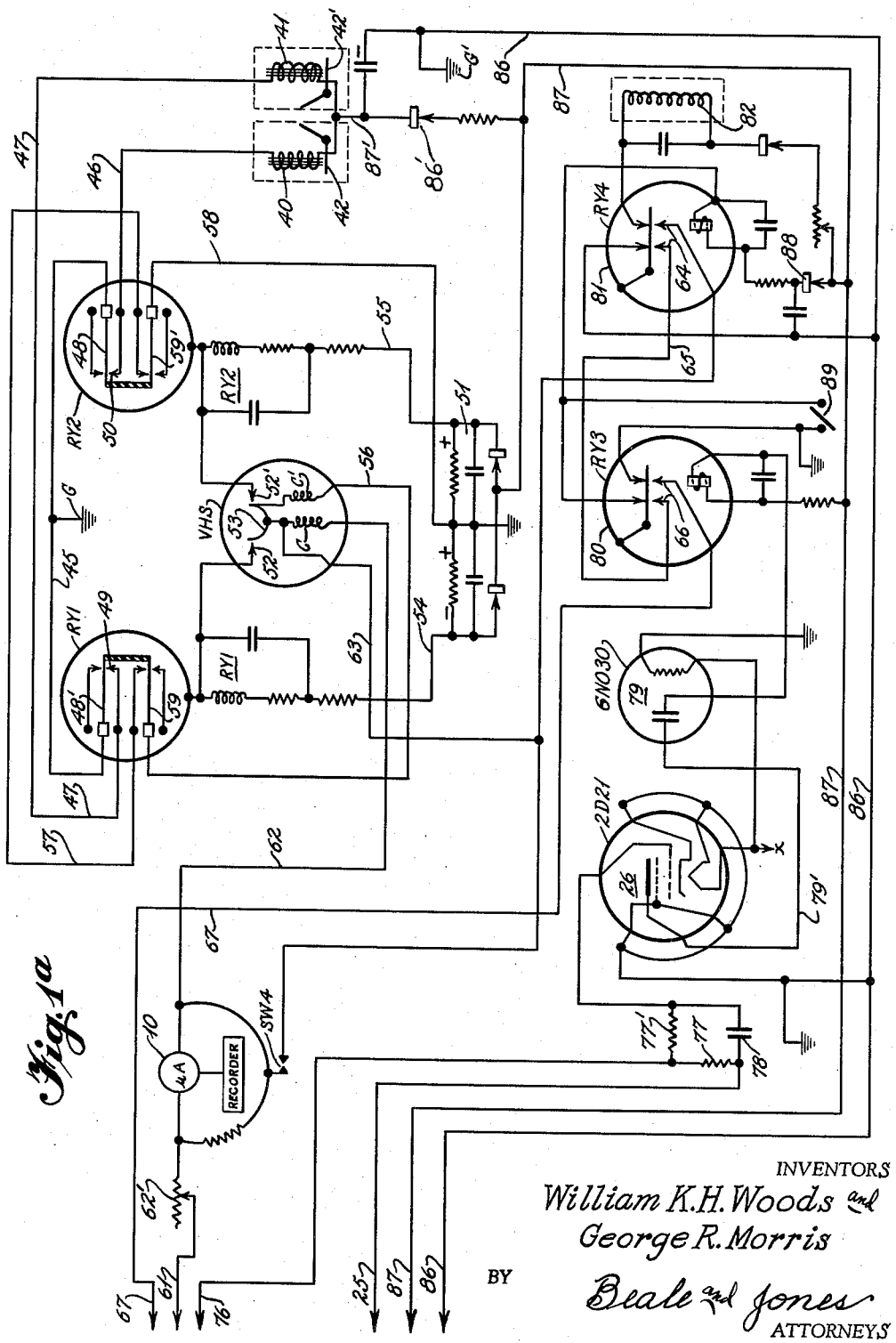

June 20, 1961   W. K. H. WOODS ET AL   2,989,179
APPARATUS FOR MAGNETIC TESTING WITH SPECIMEN SORTING
Filed Nov. 28, 1956   3 Sheets-Sheet 1
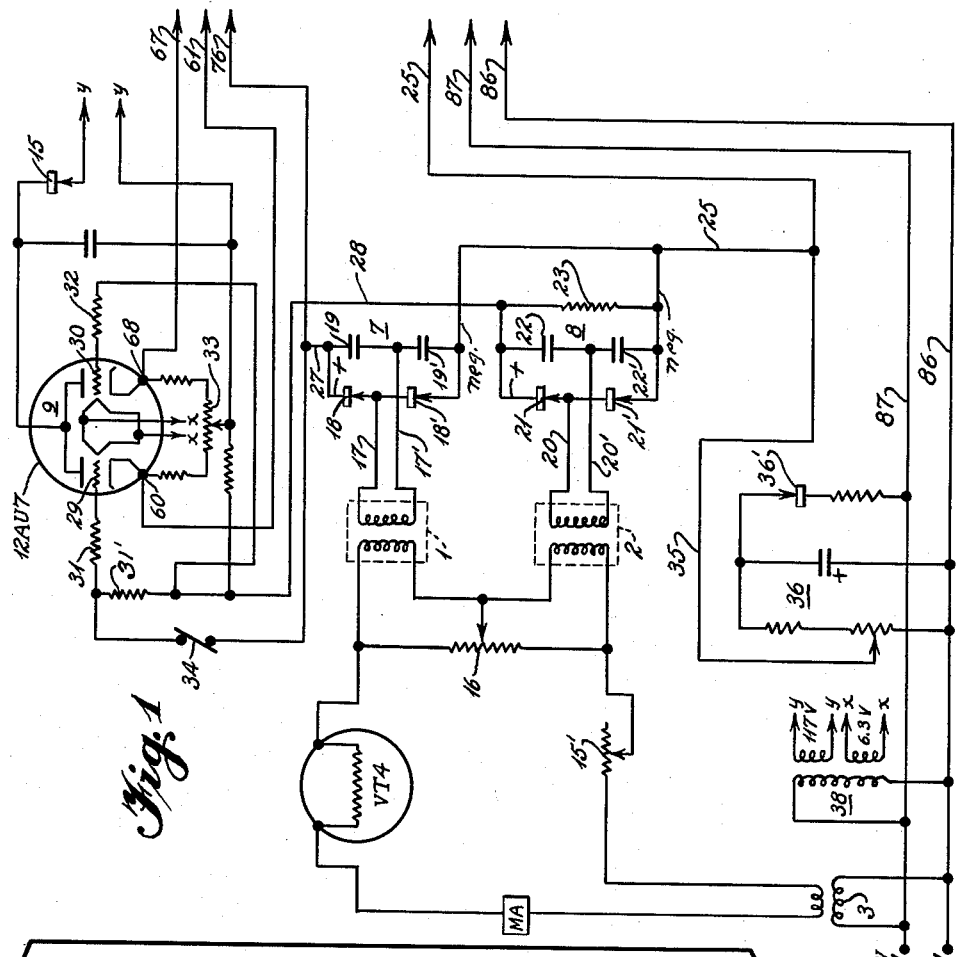
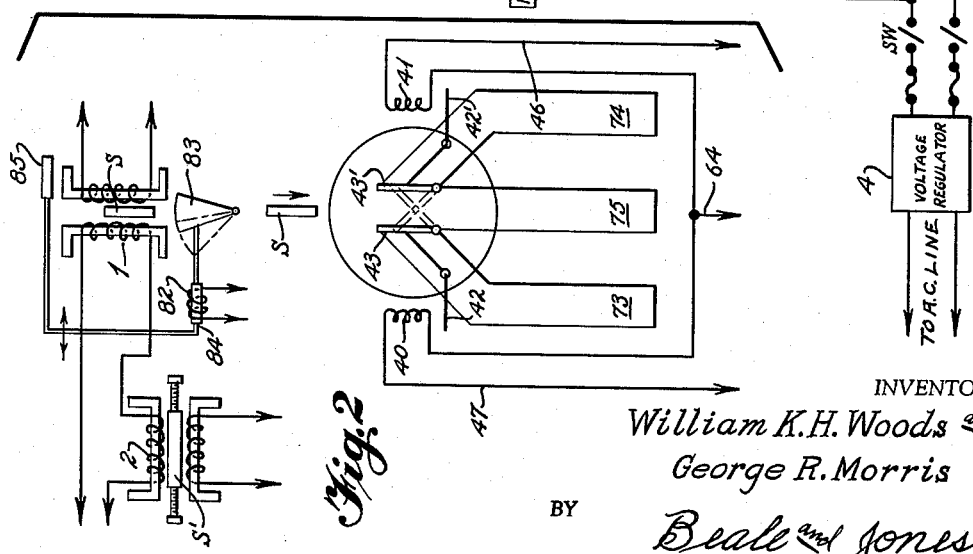
INVENTORS
William K. H. Woods and
George R. Morris
BY
Beale and Jones
ATTORNEYS June 20, 1961 W. K. H. WOODS ET AL 2,989,179
APPARATUS FOR MAGNETIC TESTING WITH SPECIMEN SORTING
Filed Nov. 28, 1956 3 Sheets-Sheet 2

INVENTORS
William K. H. Woods and
George R. Morris
BY
Beale and Jones
ATTORNEYS

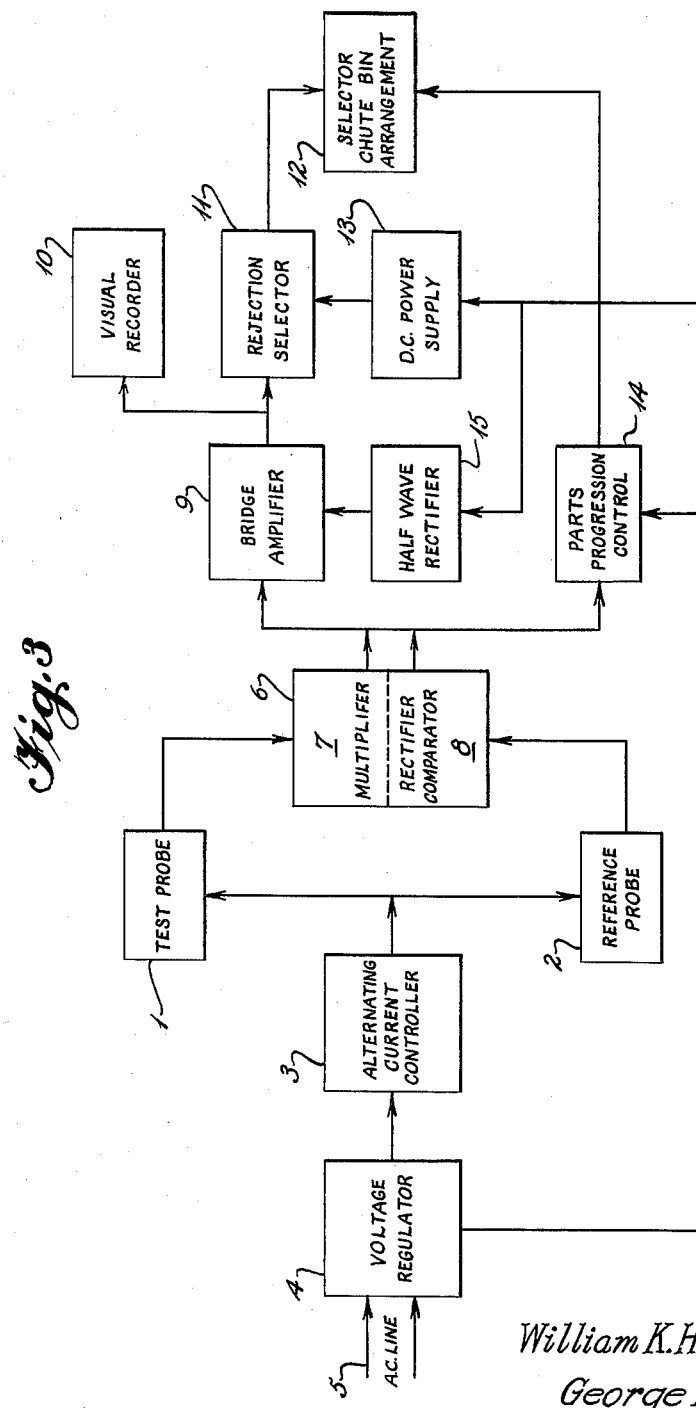

United States Patent Office 2,989,179
Patented June 20, 1961

2,989,179
APPARATUS FOR MAGNETIC TESTING WITH SPECIMEN SORTING
William K. H. Woods, 1905 Fannin St., Amarillo, Tex. and George R. Morris, 4573 E. 45th St., Tulsa, Okla.
Filed Nov. 28, 1956, Ser. No. 624,895
13 Claims. (Cl. 209—72)

This apparatus relates to a physio-metallurgical analyser particularly adapted for magnetically testing a series of specimens, automatically, by means of electronically controlled circuits and includes means to separate or reject specimens that deviate materially as to a predetermined tolerance when compared with an acceptable standard specimen.

The main object of the invention is to provide a voltage comparator of the rectifier multiplier type which is operably responsive to differences in voltages generated in a test probe and in a reference probe during the time that a test specimen is in the magnetic field of the test probe. The method of testing involves the use of a reference probe which, at all times, will retain an adjustable core in the magnetic field thereof. This core is, preferably, the equivalent of, at least a near standard specimen. The probes are identical in construction and the primary coils of both probes are energized with a constant value of ampere turns. The comparator comprises two units and one unit is impressed with the voltage derived from the reference probe. With a test specimen in the field of the test probe, the voltage generated therein will vary according to the magnetic character of that specimen.

It is known that a number of physical characteristics of various materials may be determined, to a considerable degree, by a study of the magnetic characteristics of the material; as an example, the physical dimensions, i.e., the diameter or the mass will affect the energy losses in the material due to eddy currents and hysterisis and thus will affect the balance between the reference probe and the test probe. Likewise, the flaws in the material such as cracks, however minute, and the bubbles or blow holes will affect both the mass and the continuity of the magnetic circuit and the magnitude of the flux field with a resultant unbalance of the system. Thus, when adjusted for the various conditions, the magnetic study of a material will show the effects of the crystalline structure (and hardness), the mass, the flaws, etc.

The voltages produced in the test probe and in the reference probe are compared by the comparator units and the difference is impressed upon a bridge amplifier tube and associated circuits, the output circuit of which controls both a visual indicator or recorder and a rejection selector unit.

Another object is to provide a visual indicator or recorder that will be operably responsive to voltage differences received from the comparator for indicating or recording magnetic variations in compared specimens.

A further object is to provide a rejection selector unit that is operably responsive to said voltage differences as determined proportionally by the bridge amplifier and impressed upon the operating coil of the main relay of the rejection selector.

A further object is to provide what we call a parts progression control which includes a trip coil that is oper-
ably responsive to a triggering tube of the thyratron type. This tube, in turn, is operably responsive to the rise or difference in voltage from the instant that the test probe is empty to the instant when the test probe has a test specimen therein, that is, the insertion of the test specimen into the test probe produces a rise in volage that triggers the thyratron.

In the drawings:
FIGURES 1 and 1a are schematic circuit diagrams of the instrument.
FIGURE 2 is a conventional showing of one form of trip coil means used to control specimen feed and specimen sorting, and,
FIGURE 3 shows a block diagram of the various elements of the instrument.

Magnetomotive force may be derived from a coil carrying an electric current and can be expressed by the equation:

$$F = \frac{4\pi NI}{10}$$

where N is the number of turns around the magnetic circuit and I is the number of amperes flowing in these turns of metallic conductor.

Reluctance is the resistance that a material of a magnetic circuit has to the acceptance of magnetic flux lines and may be expressed as follows:

$$R = \frac{L}{\mu A}$$

where L is the length of the magnetic circuit, $\mu$ is the permeability of the material and A is the cross sectional area. Hence:

$$\text{flux } \phi = \frac{4\pi NI}{10} \times \frac{\mu A}{L}$$

We see, therefore, that for a given physical size and arrangement of a magnetic circuit and with a constant exciting current the flux will vary in direct proportion to variations in permeability.

Using the basic formulae above, we have invented a device that is capable of nondestructive tests involving physical properties of ferrous and non-ferrous materials. This instrument, as described herein, measures automatically the degree of difference in the molecular or granular structure of these materials from a predetermined standard. Some of the many uses that our apparatus has are:

Detection of cracks, porosity and occlusions.
Determinations of hardness, depth of case hardening, core hardness, tensile strength, thickness of plating, composition and stress.

Referring in general to the block diagram shown by FIGURE 3, a test probe 1 and a reference probe 2, each of the transformer type, have their primary coils in series circuit with the output coil of an A.C. transformer 3 that is energized from a voltage regulator 4 and an A.C. source 5. The primary coils of both probes are identically wound so that they will have identical ampere turns with the same current therein.

Voltage signals from these probes are impressed upon a voltage multiplier rectifier comparator which comprises two similar units 7 and 8 that are fed, respectively, from the probes 1 and 2, and these units function to compare the voltages received from these probes. According to what extent the voltages in these probes differ relatively, the output voltages from these units might be equal or the voltage from unit 7 might be higher or lower than that from unit 8. A bridge amplifier 9 is operably responsive to said voltage differences.

This amplifier, in turn, controls a visual indicator or recorder 10, a rejection selector 11 and a selector chute with receiving bins 12 for specimen sorting. D.C. power supplies 15 and 13 feed units 9 and 11 respectively. A parts progression control 14 is provided to control the feeding of test specimens to the test probe.

Referring to FIGURE 1, test specimens are subjected to analyzation by the test probe. This probe, basically, is a transformer with a primary input of a constant value of A.C. ampere turns. The output of this probe is converted to direct current by a voltage multiplier rectification of the output of the secondary coil. The alternating current fed to this probe is measured by a milli-ammeter MA and is controlled within very close limits by adjustment of a resistance 15' and a potentiometer 16. Voltage output from this probe varies in accordance with the magnetic characteristics of the test specimens. VT4 is an automatic current control. The resistance 15' selects the control level and the potentiometer 16 provides a fine adjustment between the primary coils of the probes 1 and 2.

The voltage output from the reference probe 2 is impressed upon the unit 8 of the comparator, and this voltage is closely controlled in the comparator circuit. The basic function of the comparator is to compare any voltage differences received from the two probes 1 and 2. These differences are fed into a detecting system of sequential relaying for proper acceptance or rejection decisions. The types of probes used could include either air core coils or coils with ferro-magnetic cores and the design of the probes will vary in accordance with the material under analysis, its physical dimensions and the purpose of the investigation.

The comparator

The comparator is comprised of two similar units 7 and 8, and each unit functions as a voltage multiplier rectifier circuit. The A.C. voltage from test probe 1 is impressed upon unit 7 which amplifies that voltage and converts from A.C. to D.C. Simultaneously, another output voltage signal is received from the reference probe 2 and impressed upon the unit 8. This latter voltage and its associated comparator unit are closely controlled. During testing operations, these two voltage signals are compared and any differential between them is reported into a relay system from the comparator. As will be explained later on, all preliminary adjustments are made while each probe has a standard specimen therein. The standard in the reference probe may be a near standard and may take the form of an adjustable plug S' as shown in FIGURE 2.

The rectifier multiplier units 7 and 8 are similar. The output terminals 17 and 17' from probe 1 are connected respectively between the rectifiers 18 and 18' and the condensers 19 and 19'. Similarly, the terminals 20 and 20' from the probe 2 are connected respectively between the rectifiers 21 and 21' and condensers 22 and 22'. A resistance 23 is in shunt with condensers 22—22'.

The current in the primary coil of the test probe is controlled and set at a predetermined value by the milli-ammeter MA, and there is no intentional deviation in this current. There is a constant value of ampere turns to the primary coils of both probes because these primaries are in series and similar as to the number of coil turns. Any deviations resulting from different interference with the lines of force are in the voltage output by the secondary of the test probe coil. It is this alternating voltage after it has been rectified and multiplied that is compared to the D.C. voltage of the companion comparator circuit which has been impressed by a constant A.C. voltage derived from the reference probe.

The negative terminals of the comparator units are bound together and connected to a conductor 25 which feeds the grid of a 2D21 type of thyratron 26 shown in FIG. 1a. The two positive terminals 27 and 28 form the output circuit of the comparator. After both units of the comparator have been adjusted to put out the same voltage using standard specimens in each probe, any deviation measured as a result of different interference with the flux lines is in the voltage output of the secondary coil of the test probe.

The bridge amplifier

Any difference in voltage detected by the comparator is noted by the bridge amplifier unit 9. This unit includes a standard 12AU7 twin triode tube. The positive conductors 27 and 28 from the comparator units are connected to the grids 29 and 30 of this tube through resistances 31 and 32, and a potentiometer 33 is provided to adjust this amplifier. The conductor 28 is connected to the conductor 27 through a biasing resistor 31'. A switch 34 is in series with the conductor 27. The 12AU7 tube has one side in one branch of the bridge and the other side in the opposite branch. One grid changes in E.M.F. to change the tube resistance while the other grid remains at constant potential. The unbalance is indicated by the microampere circuit which is between the two cathodes. This circuit is in series with the operating coil of a polarized relay VHS as shown in FIGURE 1a. The 12AU7 tube operates in a balanced bridge amplifier the electronic principle of which is used in many applications. The output of this amplifier is a current value measured in microamperes which responds linearly to changes in the E.M.F. input to the grid of this tube.

The negative sides of the comparator units are bound together and connected by the conductors 25 and 35 to a potentiometer 36 which is energized from conductors 86—87 through rectifier 36' to apply D.C. to the thyratron grid. An isolating and filament transformer 38 serves as a filament heating source for heating various cathode filaments and also as the source for rectifier 15 serving the 12AU7 plate circuits.

The rejection selector

The rejection selector unit 11 is a very important element of the apparatus because it is adapted to "see" or detect the difference in voltage existing at any instant in the comparator and, thereafter, control specimen sorting. This detection is obtained by a polarized selector relay VHS in a manner to control the sorting of specimens. Two relays RY1 and RY2 are the rejection selector components that control energization of the selector coils 40 and 41 shown in FIGURE 1a and more in detail in FIGURE 2. These are trip coils and, with their associated armatures 42 and 42', are positioned below and in alignment with the test probe 1 in a manner to control the specimen deflecting gates 43 and 43'. Conductors 46 and 47 from contactors 49 and 50 of relays RY1 and RY2 are in series with coils 40 and 41 and a conductor 45 connects armatures 48 and 48'. These relays receive their energy from the double rectifier 51 through contacts 52 and 52' made in the VHS relay. Plus or minus voltage signals from the bridge amplifier unit will cause these relays to operate. The circuit traversed by these signal voltages will be explained in the following paragraph and conventional current directions are used.

In the VHS relay, two coils C and C' are wound on a pivotally mounted bobbin, and the coil C' terminates in a contractor 53 that swings with this bobbin coil set in a manner to make contact with 52 or 52' as determined by the direction of the plus or minus signal current in the relay energizing coil C. The coil C' serves as a coil in a holding circuit in a manner to give a high contact pressure between contactor 53 and contacts 52 and 52' and this regardless of the magnitude of the signal input voltage. With no signal input, the moving coil is on zero center with contacts 52 and 52' open. When contactor 53 makes a circuit at 52 or 52', the armature operating coils in relays RY1 or RY2 are energized from the rectifier 51 through conductors 54 or 55.

Normally, with no current in the armature operating coils of relays RY1 and RY2 (shown conventionally just below each relay) both armatures are in their full up positions. When either coil is energized, its respective armature is pulled to its lowermost position to break the respective holding circuit. Conductor 45 and contactors 49, 50 serve only to control coils 40 and 41. Conductor 57 and contactors 59, 59' serve only to control the energization of the holding coil C'. The pulling down of the armature 59 or 59' breaks the "seal-in" energy in coil C' and also the power through relay RY1 or relay RY2 whichever is the case. When the circuit through either relay is energized, the respective relay circuit components are of such values and arrangement to give just enough delay in closing and opening to give proper operation of selector coils 40, 41 that control the specimen deflecting gates 43, 43'.

When the circuit is made at 52', armature contactors 59 and 59' being in the up position, current flows through conductor 55, RY2, contacts 53 and 52', coil C', conductor 56, contactor 59, conductor 57, contactor 59' and conductor 58, and back to the rectifier. Hence coil C' acts to increase pressure between 53 and 52' but, as soon as the signal current in coil C ceases, the contactor 53 moves to its dead center and armature 59' drops down to break the holding circuit. This same action will occur when contact is made at 52 and 53, but the holding circuit will be 54, RY1, 52, 53, coil C', 56, 57, 58 and back to 51. The complete circuit of the signal voltages between the amplifier 9 and the VHS relay is as follows: from the point 60 in the external cathode circuit through conductor 61, variable resistance 62', recorder 10, coil C, conductor 63 to a relay 81 and through two series made contacts 64 thereof, conductor 65, to a relay 80 and through two series made contacts 66 thereof and by conductor 67 back to a point 68 in said external cathode circuit.

The rejection selector trip coils 40 and 41 are energized by current from conductors 86 and 87 from the A.C. source 5 which current is rectified by a rectifier 86'. When, say a plus signal causes relay RY2 to operate, its contactor 48' moves down to make a circuit through selector coil 40 from conductor 87' through 40, 46, 50, 48, 45 and grounds GG' back to conductor 86. A minus signal will drop armature 48' to make a coil circuit through 87', 41, 47, 49, 48', 45 and grounds GG' back to conductor 86. Then, in FIGURE 2, gates 43 or 43' will be moved to cause say a too hard or a too soft specimen S to drop through chutes 73 or 74. If a specimen tests OK, no signal will be given; and it will not be deflected but will pass through the central chute 75.

*Parts progression control-specimen feed and release*

The parts progression control is through the triggering of the thyratron 26, and the sequence of operation of this tube and its associated elements will be described later on. The thyratron 26 does not respond to any differences in output voltages of the comparator. The rise in E.M.F. that triggers this thyratron is the difference in the E.M.F. from when the test probe 1 is empty to when this probe has a test specimen therein. The insertion of a test specimen into the test probe produces the rise in voltage that triggers tube 26. Hence, this tube is the initially energized component of the parts progression control. Output voltage from the positive side of the comparator is impressed upon the grid of the thyratron through the conductor 76 and through resistances 77—77' and a condenser 78.

A delay tube 79 of the 6NO30 type is in series with the plate circuit of the thyratron through conductor 79' for its protection only to permit the cathode to heat. The two relays 80 and 81 operate in a definite sequence to properly energize a trip coil 82. When relay 81 is de-energized, the trip coil is energized to release a test specimen from the test probe. When relay 80 is de-energized, after tube 26 is de-triggered, the relay 81 is energized ready to accept a new specimen. The trip coil 82 controls a specimen release plate 83 operated by an armature 84. This armature also controls a specimen feed gate 85.

The sequential operation of relays 80 and 81 is responsive to triggering of the thyratron 26 and same becomes triggered when a new test specimen is fed into test probe 1 which action causes a rise in voltage from unit 7 as compared to the voltage from that unit with no specimen therein. As will be explained more in detail later on in the operational steps of the parts progression elements, resistances 23, 36 and 77 are selected or adjusted so that tube 26 is just triggered and, thereafter, when a test specimen is released from the test probe 1, a reduction of voltage is produced across the resistance 77 thereby de-triggering this tube, by rendering it non-conducting. When 26 is de-triggered, relay 80 becomes de-energized and relay 81 becomes energized. At each specimen test, a signal is given to indicator 10 and coil C of the VHS relay while armatures of 80 and 81 are both down because of an inherent delay opening time given to relay 81 by the capacitance across its operating coil, both relays being energized.

To complete the connections of the comparator units 7 and 8 and the amplifier 9 with the rejection selector unit 11 and the parts progression unit 14, conductors 86 and 87 are energized by constant voltage from the regulator 4. Transformer 38 and potentiometer 36 are energized from said conductors. The conductor 87 is connected to one end of the coil of relay 80, and the other coil end is connected through conductor 79' to the plate of the thyratron 26 through the delay relay 79. This conductor 87 is then connected through a rectifier 88 to the coil of relay 81. A normally closed switch 89 is in shunt with a lateral pair of contactors of the relay 80. This switch is to be closed, temporarily, during adjustment of the bridge amplifier 9 by potentiometer 33 and while a standard specimen is in the field of the test probe. The conductor 87 is connected, also, to the midpoint of the double rectifier 51 and through a rectifier 86' to the midpoint of coils 40—41 by a conductor 87'.

*Operation of the apparatus*

The final adjustment step during the time that an adjustable core or a standard specimen S' is retained in the field of the reference probe 2 and with a substantially similar standard specimen S retained in the field of the test probe 1, is to close switch 34 and adjust the core in probe 2 until the recorder 10 reads zero. Thereafter, prior to any insertion of a specimen to be tested in probe 1, we will have the following balanced condition in comparator units 7 and 8: comparator unit 8 will constantly produce say plus 12 volts on its output lead while unit 7 will produce say plus 11 volts or plus 13 volts on its output lead. The greater the differences in magnetic quality of the specimens tested, the greater will be the differences in voltages and these differences are impressed upon the grid of the amplifier tube 9.

The positive end of unit 7 is connected through conductor 76 to the thyratron grid. The negative ends of units 7 and 8 are connected by conductor 25 to the grid of the thyratron. The upper or positive ends of both units are connected by conductors 27 and 28 respectively, through a resistor 31 to one grid 29 of the 12AU7 tube. There is a constant plus E.M.F. from unit 8 and a variable plus E.M.F. from unit 7 affecting the lefthand side grid. However, to affect the thyratron to initiate specimen feed control, the plus and minus terminals of unit 7 are connected to the thyratron grid whereby, when a specimen is moved into and then out of probe 1, the extreme change in the voltage in unit 7 will be impressed upon this grid to control the triggering.

Hence, the grid control and consequent triggering is effected through the difference of the voltage from unit 7 when a test specimen is in the test probe 1, as compared to a lower voltage from unit 7 when no specimen is in probe 1. The thyratron tube is adjusted to trigger only when the test specimen is inserted in probe 1 which causes a sudden rise in voltage output from unit 7. This trigger action has no reference or bearing on the relationship and differences of voltages from units 7 and 8. Triggering is obtained solely from the isolated or entire output from unit 7.

The potentiometer 36 is so adjusted after closing the PB switch 89 that the low voltage put out from unit 7, when there is no test specimen in probe 1, is too low to trigger but when the specimen is inserted in probe 1, the voltage from unit 7 rises to, say 11 volts to 13 volts, either value of which is satisfactory for triggering the thyratron. This triggering is for proper timing for the test and subsequent operation of trip coil 82 and should be dependent only on the fact that a new piece has been inserted for test.

After initial adjustments, thyratron 26 will be left triggered and with relays 80 and 81 both energized. To start testing, open PB switch 89. Any specimen in probe 1 under test will produce any one of three signals from the comparator units:

(1) If specimen is OK, there will be no difference in voltage.

(2) If specimen is too hard, a difference of say plus one volt is obtained.

(3) If specimen is too soft, a difference of say minus one volt is obtained.

This plus or minus one volt will function to throw the VHS relay either to the left or to the right. These plus or minus signals can reach the VHS relay through conductors 67, 65 and 63 and through coil C, recorder 10, 62 and 61. Conductors 61 and 67 lead from the cathodes of the 12AU7 tube 9.

Assuming that the instrument has been adjusted with a standard specimen S in probe 1 and a core or near standard S' in probe 2, a desired milli-ampere adjustment of say 400 milli-amperes is made in the current supply to the series primary coils of the two probes. Also, potentiometer 36 has been adjusted until thyratron 26 is barely triggered to permit relays 80 and 81 to energize. No operation of the two trip coils 40 or 41 can occur until the VHS relay has been operated by a plus or by a minus signal received from the amplifier 9. That is, this relay "sees" the voltage differences that occur in the comparator units 7 and 8 which differences can be called plus or minus that are used to energize the recorder 10, and to operate the rejection selector unit 11. As test specimens are fed through probe 1, the left side grid of tube 12AU7 might vary from plus one volt down to minus one volt due to hard or to soft specimens. These signals are fed to the grid 29.

The signal from the amplifier 9 completes its circuit from one cathode 60 through conductor 61, recorder 10, coil C of the VHS relay, conductor 63, two series "made" contacts 64 of relay 81, conductor 65, two series "made" contacts 66 of relay 80, and conductor 67 back to the other cathode of amplifier tube 12AU7. This signal will energize coil C either plus or minus to make contact at either 52 or 52' to determine if either relay RY1 or RY2 is to operate to cause energization of the trip coil 40 or 41 to operate rejection gates 43 or 43'. At the same time, or at least by this same signal through the completed circuit, recorder 10 may record a plus or a minus specimen. If a specimen tests OK, no signal will affect coil C and neither gate will be operated and that specimen will drop through the central chute 75.

As before explained, after initial adjustments with the PB switch 89 closed, the tube 26 will be left triggered with both relays 80 and 81 energized and their armatures down. Then, by releasing switch 89, the system is put into operation. Relay 81 is de-energized causing trip coil 82 to be energized and thus releasing the test specimen from its place in the test probe magnetic field. In explaining the system up to this point, the standard test specimen in test probe 1 has been balanced against the standard reference specimen in reference probe 2 and the potentiometer 36 has been adjusted so that thyratron 26 is triggered. It will be noted that, schematically, resistance 77 loads the output of unit 7 just as resistance 23 loads the output of unit 8. Both resistances are identical. Since conductor 86 and the cathode of tube 26 and the end of potentiometer 36 are all at ground potential, adjustment of 36 through conductor 25 also adjusts the lower end of resistance 77 with respect to the cathode of tube 26. Thus, adjusting the lower end of 77 produces a like adjustment of the upper end of 77 which directly controls the control grid of 26. If the adjustment is made so that 26 is just triggered, a subsequent reduction of voltage across 77 caused when a test specimen is released from test probe 1 will lower the control grid voltage with reference to the cathode, thus causing 26 to be de-triggered. When the specimen is so released, the magnetic field concentration naturally is reduced in test probe 1 causing a reduction of voltage output from the secondary of this test probe. This causes a corresponding reduction of the output voltage of unit 7 which is the voltage across 77. Thus the upper end of 77, and the grid which it controls, lowered in voltage with respect to the cathode, causes the tube 26 to become non-conducting. This, in turn, de-triggers tube 26, de-energizes relay 80 and energizes relay 81 thus making the instrument ready to accept another specimen.

It will be noted that, when relay 80 is de-energized in armature up condition, the top contacts effectively complete the circuit from the positive end of rectifier 88 through the operating coil of relay 81 and back to ground. In this energized condition, the armature of 81 is down and contacts 64 are closed and the top contacts of 81 are open which leaves trip coil 82 de-energized. When a next specimen is inserted, the sequence is repeated, voltage from unit 7 increases, this being the voltage referred to above as being that voltage impressed across resistance 77, the upper end of which controls the control grid of tube 26, triggering this tube when this voltage is raised and de-triggering it when lowered as described above. The voltage difference in the output of unit 7 as compared to that of unit 8 is fed into the bridge amplifier 9 and tube 26 is triggered, that is, this is due to the increase of the voltage output from unit 7 when the specimen is inserted in test probe 1, relay 80 is energized and the VHS relay detects this voltage difference, if any, and acts accordingly and relay 81 becomes de-energized, that is, when 80 is energized, contacts 66 are closed in series with contacts 64 momentarily completing the detecting circuit through 60, 61, 62', 10, 62, C, 63, 64, 65, 66, 67 and 68 causing relay VHS to properly select or detect the quality of the tested specimen. The time required for this selection process is made possible by placing an opening time delay capacitance across the terminals of the operating coil of relay 81 which permits trip coil 82 to be energized and the specimen to pass out of the magnetic field. That is, after the above mentioned time delay of the armature release of relay 81, it is released and the closing of the upper contacts energizes coil 82 to release the specimen. A signal is given to the indicator and the coil C of relay VHS while armatures of both 80 and 81 are down because of the inherent delay opening time given to relay 81 by the capacitance across its coil.

The disclosure in this application embodies both the basic novel combination involved as well as minor details associated therewith that contribute to a practical embodiment of the invention. However, it is to be under-

We claim:

1. In an apparatus for magnetic testing, a test probe and a reference probe, each probe having a primary and a secondary coil, the primary coils of both probes being similarly wound and connected in series, means for energizing said primary coils with a constant current, a first comparator unit energized by voltages produced in the secondary coil of the test probe, a second comparator unit energized by voltages produced in the secondary coil of the reference probe, both of said units being of the voltage multiplier type and each unit having a positive and a negative output terminal, a twin triode amplifier tube, each triode having a plate, grid and cathode, the positive terminals of the units being connected together through a resistance, the positive terminal of the first unit being connected to one grid of the tube, the positive terminal of the second unit being connected to the other tube grid, the cathodes of both tubes being connected together each through a load resistor and, in common, to the positive terminal of the second unit, and a circuit including an indicator connected across the two cathodes of the tube for comparing the difference in voltage produced in the secondary coils of said probes when a standard specimen is placed in the field of the reference probe and a test specimen is placed in the field of the test probe.

2. In a magnetic testing apparatus, a test probe and a reference probe, each probe having a primary coil and a secondary coil, the primary coils being connected in series and having the same number of turns, means to maintain a constant value of alternating current in said primary coils, means to retain a standard specimen in the field of the reference probe and a test specimen in the field of the test probe, a first comparator unit of the voltage multiplier rectifier type impressed by voltage from the reference probe, a second and similar unit impressed by voltage from the test probe, each unit having a positive and a negative output terminal, a twin triode amplifier tube having a pair, each, of anodes, grids and cathodes, a resistance connected across the positive terminals, the positive terminals of each unit thereafter being connected, respectively, to a different tube grid, the cathodes of both tubes being connected together each through a resistor and, in common, to the positive terminal of the reference unit whereby to compare voltages produced in said units when a standard specimen and a test specimen are in respective probe positions.

3. In an apparatus as set forth in claim 2, a visual indicator connected in a circuit across the two tube cathodes for comparing voltage difference produced in the comparator units, the output current of the amplifier tube being linearly responsive to the voltage changes impressed upon the grid that is connected to the positive terminal of the second unit that is connected to the test probe.

4. In a magnetic testing and sorting apparatus, a reference probe and a test probe, each probe comprising primary and secondary coils, the primary coils being in series and having an equal number of turns, means to excite the primary coils with a constant value of alternating current, means for feeding test specimens to the test probe, means for retaining a standard specimen during test within the field of the reference probe, a pair of comparator units of the voltage multiplier rectifier type energized, respectively, by the secondary coils of said probes for comparing the output difference in voltage of the secondary coils, each unit having a positive and a negative output terminal, the negative terminals of the units being connected together, an amplifier tube of the twin triode type, both positive terminals being connected to one grid of the tube, a resistance connected across said positive terminals the other grid being connected to the positive terminal of the reference unit, a conductor connecting both tube cathodes, the positive terminal of the reference unit being connected to said conductor to provide a completed circuit, a selector relay having an operating coil, a circuit including both tube cathodes in series and said coil, said coil being energized in response to output current from the tube through said last named circuit, a pair of trip coils, means for selectively energizing said trip coils in response to energization of the relay operating coil, a chute for receiving specimens from the test probe, a specimen deflector gate in said chute and mechanical means operable by said trip coils for moving said gate to separate sub-standard specimens from standard type specimens.

5. In a magnetic testing device, a test probe and a reference probe, each probe having a primary coil and a secondary coil, the primary coils being connected in series and having the same number of turns, means to maintain a constant value of alternating current in said primary coils, means to retain a standard specimen within the field of the reference probe to produce a constant voltage in the secondary thereof during test operation, a pair of comparator units impressed, respectively, by voltages from the test and reference probes, said units being of the voltage multiplier rectifier type and each having a positive and a negative output terminal, an amplifier of the twin triode type, both positive terminals being connected to one tube grid and the positive terminal of the reference unit being connected to the other tube grid, both negative terminals being connected to the tube cathodes, in common, whereby variations in the positive output of the test comparator unit will vary the conductance of said tube, an external circuit in shunt with the tube cathodes, a selector relay having a movably mounted operating coil in circuit with the cathode circuit of said tube, pairs of contacts in said relay selectively operable in response to movement of said coil, a pair of trip operating coils in circuit with said pairs of contacts, and means operable by said trip coils for separating tested specimens according to their magnetic characteristics.

6. In a magnetic testing and sorting apparatus, a constant source of alternating current supply, a test probe and a reference probe, means for feeding a series of specimens to be tested to the test probe, each probe having a primary and a secondary coil, the primary coils being in series and excited by a constant number of ampere turns, the output voltage of the reference probe being constant and the output voltage of the test probe being variable according to the magnetic characteristics of the specimens fed thereto, a first comparator of the voltage amplifier rectifier type in circuit with the secondary of the test probe for detecting voltage variations therein, a second and similar comparator in circuit with the secondary coil of the reference probe, each comparator having a positive and a negative output terminal, a thyratron tube having an anode, a cathode and a grid, a first conductor connected to the positive terminal of the first comparator, a second conductor connected to both negative terminals of the comparators, both conductors being connected to the thyratron grid, a resistance in shunt with said conductors, a potentiometer circuit including a biasing resistance and a rectifier connected to said current supply, said last named circuit being connected across the thyratron cathode and grid, a relay having an operating coil, said coil being in the anode-cathode circuit of the thyratron whereby, when the thyratron is triggered by increase in control voltage due to the entry of a new test specimen to the test probe, the relay will be energized, a feed gate for controlling specimen feed to the test probe and having an operating coil, and means operable responsive to energizing the relay coil for energizing said coil associated with the feed gate to cause release of the specimen from the test probe.

7. In an apparatus as set forth in claim 2, a thyratron tube, means for energizing the cathode-anode circuit of the tube, the negative output terminals of the comparators being connected by a conductor to the grid of the tube, a second conductor connected to the positive output terminal of the comparator that is energized by the secondary of the test probe, said last named conductor being connected also to the grid of the tube, a resistance in shunt with said conductors, whereby a voltage increase in said last named comparator produced at the instant of insertion of a specimen into the test probe will be impressed upon said grid to cause the thyratron to trigger, a first relay and a second relay, said first relay being in the cathode-anode circuit of said thyratron and adapted to be energized in response to the triggering of the thyratron, the operating coil of said second relay being de-energized in response to energization of said first relay, a gate for controlling release of specimens from the test probe, said gate being controlled by a trip coil, said second relay and said trip coil being energized in response to the de-energization of said first relay whereby to release a specimen from the test probe and a circuit including the alternating current means, a biasing resistance, a rectifier and the thyratron cathode and grid.

8. In an apparatus as set forth in claim 2, means for feeding test specimens comprising a thyratron tube, a first conductor connected to the positive terminal of the first comparator, a second conductor connected to both negative terminals of the comparators, a resistance in shunt with said conductors, a circuit including the alternating current means, a biasing resistance, a rectifier and the thyratron cathode and grid, a relay having an operating coil, said coil being in the anode-cathode circuit of the tube, whereby, when the tube is triggered by an increase in control voltage due to the entry of a new specimen into the test probe, the relay will be energized, a gate for controlling specimen release from the test probe and having an operating coil, and means operably responsive to energization of the relay for energizing said coil to cause release of the specimen from the test probe.

9. In an apparatus as set forth in claim 2, means for feeding a series of specimens into the test probe, a sensitive signal detection relay having a swingingly mounted operating coil and a single contactor thereon, said relay having a pair of selector contacts positioned to be engaged by the single contactor, a circuit including said operating coil and the cathodes of the triodes for impressing output signals from the tube upon the operating coil, a pair of selector relays each having a series of selector contactors and an operating coil, said last named coils being operably connected in circuit, respectively, with the selector contactors, a selector chute for receiving tested specimens passed through the test probe, selector gate means for rejecting and directing substandard specimens in either of two directions, a pair of selector coils for operably controlling movement of the gate means, circuits including, respectively, each selector coil and selector contactors of the selector relays, the difference of the positive output voltage of the comparator units varying according to the difference in hardness of the tested specimens, the operating coil of the sensitive relay being operably responsive to said difference in voltage whereby to cause movement of its operating coil in either of two directions to operably control, respectively, the selector coils and the gate means.

10. A magnetic testing apparatus comprising a test probe and a reference probe, means for passing a series of test specimens through the test probe while maintaining a standard specimen in the reference probe, each probe having primary and secondary coils, means for impressing a constant value of alternating current on the reference probe primary, a pair of similar comparator circuits impressed by voltage, respectively, from the secondary coils of the test and reference probes, each comparator circuit being of the voltage amplifier rectifier type, each ciruit having a positive and a negative output terminal whereby the voltage of the test comparator circuit will vary as the permeability of test specimens vary while the voltage of the positive terminal of the reference comparator remains constant, a bridge amplifier detecting circuit including a twin triode amplifier tube, each triode having a plate, grid and cathode, circuit means for impressing the voltage from both positive terminals, in common, on one control grid of the tube and the positive voltage of the reference comparator circuit on the other control grid, the positive terminals being connected together by a resistance, other circuit means for impressing said last named voltage also on the tube cathodes, and a visual indicator in series circuit with the cathode output circuit of said tube.

11. In a magnetic testing apparatus, a test probe and a reference probe, each probe having a primary coil and a secondary coil, the primary coils being connected in series circuit and having the same number of turns, means to maintain a constant value of alternating current in said primary coils, means to retain a standard specimen in the reference probe as material to be tested is passed through the test probe, a first comparator unit of the voltage multiplier rectifier type impressed by voltage from the test probe, a similar second unit impressed by voltage from the reference probe, each unit having a positive and a negative output terminal, a twin triode amplifier tube, each triode having a grid, anode and a cathode, circuit means including the positive terminals of said units and a resistance connected across the positive terminals and in which circuit both positive terminals are connected to one tube grid and the positive terminal of the reference probe is connected to the other tube grid, a conductor connecting both tube cathodes, to each through a resistor the positive terminal of the reference comparator being connected to said conductor, whereby said circuit means and the tube compares the differences in positive terminal voltages produced when material tested and a standard specimen are in the probe fields, respectively, of the secondary windings, and a visual indicator connected between the two cathodes for indicating said voltage differences, which difference is a comparison of the magnetic characteristics of the material tested and the standard specimen.

12. In a magnetic testing and sorting apparatus, a test probe and a reference probe, each probe having a primary and a secondary coil, the primary coils having the same number of turns and being connected in series, means to apply a constant source of alternating current across said primary coils whereby the primary coils are excited by the same number of ampere turns, means to retain a standard specimen in the reference probe field while the material under test is passed through the test probe field, a first comparator circuit of the voltage multiplier rectifier type in circuit with the secondary coil of the test probe and a second and similar comparator circuit impressed with voltage from the secondary of the reference probe, each circuit having a positive and a negative output terminal, the voltage output of the second circuit being constant and the voltage output of the first circuit being variable according to the magnetic characteristics of the material under test, an amplifier tube of the twin triode type, the positive terminal from the reference comparator unit being connected to one triode grid, the other positive terminal being connected to the other triode grid and, through a resistance, to the positive terminal of the reference unit, whereby one grid of the tube is maintained at a constant voltage while the voltage impressed upon the other grid varies in accordance with the positive output of the test comparator.

13. In an apparatus as set forth in claim 12, means including a gate for feeding a series of specimens to the test probe, a solenoid for controlling the gate, both negative terminals of the comparator circuits being connected together and, though a resistor, to the positive terminal of the reference comparator circuit, a thyratron tube including a relay in the output circuit thereof for controlling energization of the solenoid, a conductor connected, in common, to said negative terminals, circuit means including the input grid-cathode circuit of the tube and said conductor whereby feeding of a new test specimen to the test probe will cause an increase in the voltage of the last named circuit and, likewise, on the thyratron tube grid to render said tube conducting.

References Cited in the file of this patent

UNITED STATES PATENTS

| | | |
|---|---|---|
| 1,957,222 | Mershon | May 1, 1934 |
| 2,234,456 | Schaurte et al. | Mar. 11, 1941 |
| 2,623,635 | Ward | Dec. 30, 1952 |
| 2,647,628 | Diamond | Aug. 4, 1953 |
| 2,689,042 | Diamond | Sept. 14, 1954 |
| 2,846,065 | Alexander | Aug. 5, 1958 |

FOREIGN PATENTS

| | | |
|---|---|---|
| 478,287 | Canada | Nov. 6, 1951 |

OTHER REFERENCES

"Voltage-doubler Circuits" (pages 471–473).

"Electron Tubes In Industry," Henney; McGraw-Hill Book Co., 1937.